(12) United States Patent
Ablang et al.

(10) Patent No.: US 7,384,089 B1
(45) Date of Patent: Jun. 10, 2008

(54) VEHICLE BED COVERING SYSTEM

(76) Inventors: Jessie E. Ablang, 14933 Morningside Dr., Poway, CA (US) 92064; Emma P. Ablang, 14933 Morningside Dr., Poway, CA (US) 92064

( * ) Notice: Subject to any disclaimer, the term of this patent is extended or adjusted under 35 U.S.C. 154(b) by 0 days.

(21) Appl. No.: 11/690,455

(22) Filed: Mar. 23, 2007

(51) Int. Cl.
*B60P 7/02* (2006.01)

(52) U.S. Cl. .............................. 296/100.08; 296/100.1

(58) Field of Classification Search ........... 296/100.02, 296/100.06, 100.07, 100.08, 100.1
See application file for complete search history.

(56) References Cited

U.S. PATENT DOCUMENTS

| | | | |
|---|---|---|---|
| 3,995,890 A * | 12/1976 | Fletcher | 296/10 |
| 4,531,775 A | 7/1985 | Beals | |
| 5,110,021 A * | 5/1992 | Dawson, Jr. | 224/405 |
| D335,850 S | 5/1993 | Cyrson | |
| 5,209,543 A | 5/1993 | Harkins, Jr. | |
| 5,518,288 A | 5/1996 | Deklotz | |
| 6,106,050 A | 8/2000 | McLeod | |
| 6,254,169 B1 * | 7/2001 | Arthur | 296/100.07 |
| 6,340,195 B1 * | 1/2002 | Hall et al. | 296/100.07 |
| 6,428,079 B1 * | 8/2002 | Van Dyke | 296/100.06 |
| 6,598,930 B1 * | 7/2003 | Tilton | 296/100.06 |
| 6,663,160 B2 * | 12/2003 | Yarbrough et al. | 296/100.06 |
| 6,799,784 B2 | 10/2004 | Rios | |
| 7,246,839 B1 * | 7/2007 | Nyberg | 296/100.06 |
| 2003/0047958 A1 * | 3/2003 | Yarbrough et al. | 296/100.06 |
| 2004/0026948 A1 * | 2/2004 | Novajovsky | 296/26.08 |
| 2007/0096499 A1 * | 5/2007 | Zajicek et al. | 296/100.06 |

* cited by examiner

*Primary Examiner*—Jason S. Morrow

(57) ABSTRACT

A vehicle bed covering system for covering a cargo bed of a vehicle and allow adjustment of the location of the cover includes a pair of panels being pivotally coupled to the cargo bed of the vehicle. Each of the panels is pivotal over the cargo bed to cover the cargo bed. A plurality of hinge assemblies is coupled to a top face of a perimeter wall of the cargo bed. Each of the panels has a pair of the hinge assemblies coupled thereto to permit the panels to pivot with respect to the cargo bed. Each of the panels has one of a pair of rams mounted thereto. Each of the rams is mountable to a bed surface of the cargo bed. The rams push against the panels to maintain the panels in an open position when the rams are mounted to the bed surface.

16 Claims, 10 Drawing Sheets

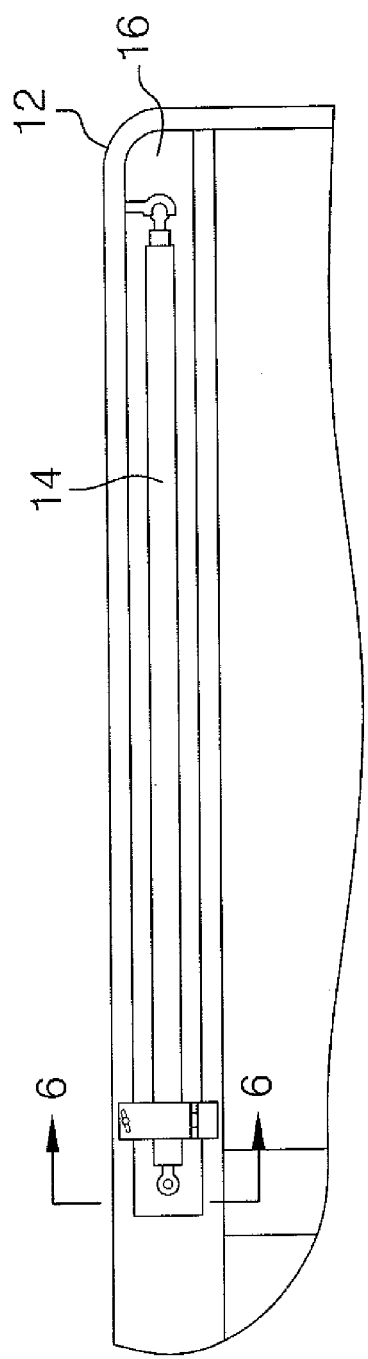
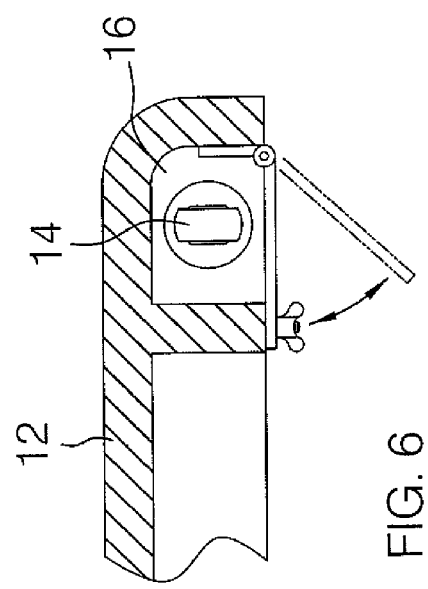
FIG. 5
FIG. 6

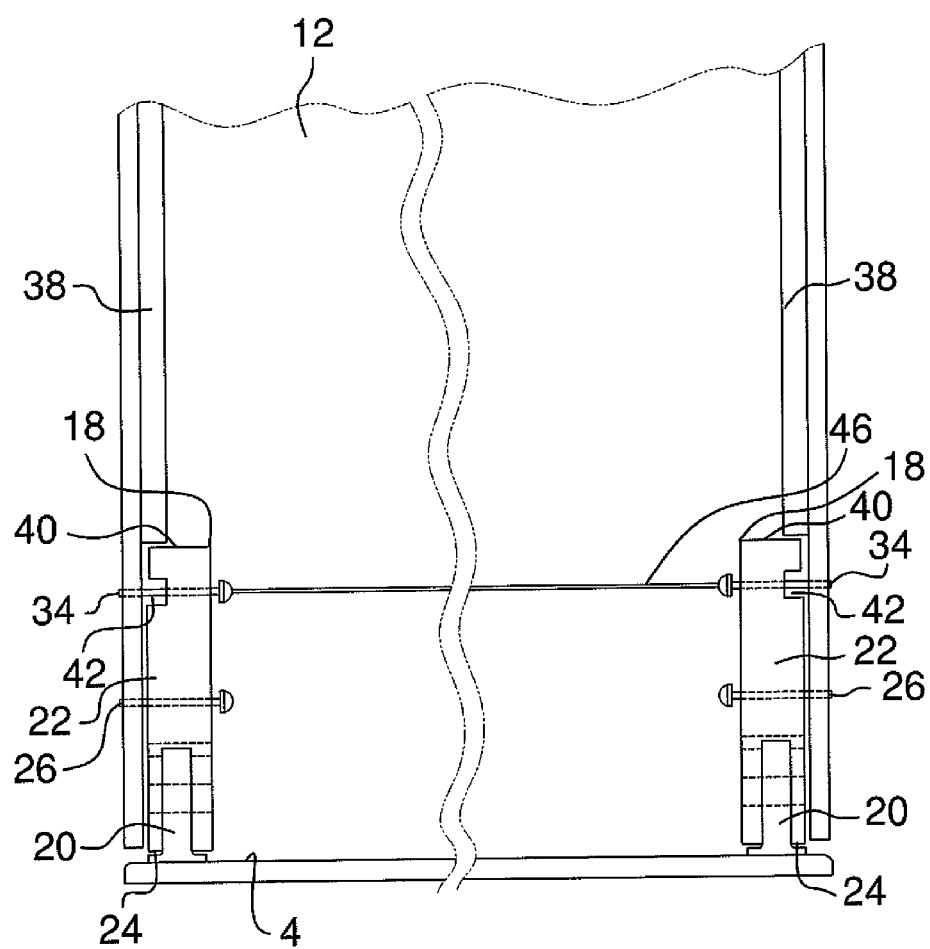

VEHICLE BED COVERING SYSTEM

BACKGROUND OF THE INVENTION

1. Field of the Invention

The present invention relates to truck bed covers and more particularly pertains to a new truck bed cover for covering a cargo bed of a vehicle and allow adjustment of the location of the cover.

2. Description of the Prior Art

The use of truck bed covers is known in the prior art. While these devices fulfill their respective, particular objectives and requirements, the need remains for a system that has certain improved features to allow the system to cover a cargo bed of a vehicle and then be repositioned to allow greater access to the cargo bed. Additionally, the system should include hinge assemblies that allow vertical adjustment of panels of the system to allow the panels to be positioned along side of the cargo bed when access to the cargo bed is required.

SUMMARY OF THE INVENTION

The present invention meets the needs presented above by generally comprising a pair of panels, each being pivotally coupled to the cargo bed of the vehicle. Each of the panels pivots over the cargo bed to cover the cargo bed. A plurality of hinge assemblies is coupled to a top face of a perimeter wall of the cargo bed. Each of the panels has a pair of the hinge assemblies coupled thereto to permit the panels to pivot with respect to the cargo bed. Each of the panels has one of a pair of rams mounted thereto. Each of the rams is mountable to a bed surface of the cargo bed. The rams push against the panels to maintain the panels in an open position when the rams are mounted to the bed surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side view of the storage channel of one of the panels of the present invention.

FIG. 6 is a cross-sectional view of the present invention taken along line 6-6 of FIG. 5.

FIG. 11 is a side view of one of the panels of the present invention.

DESCRIPTION OF THE PREFERRED EMBODIMENT

Figure 1:
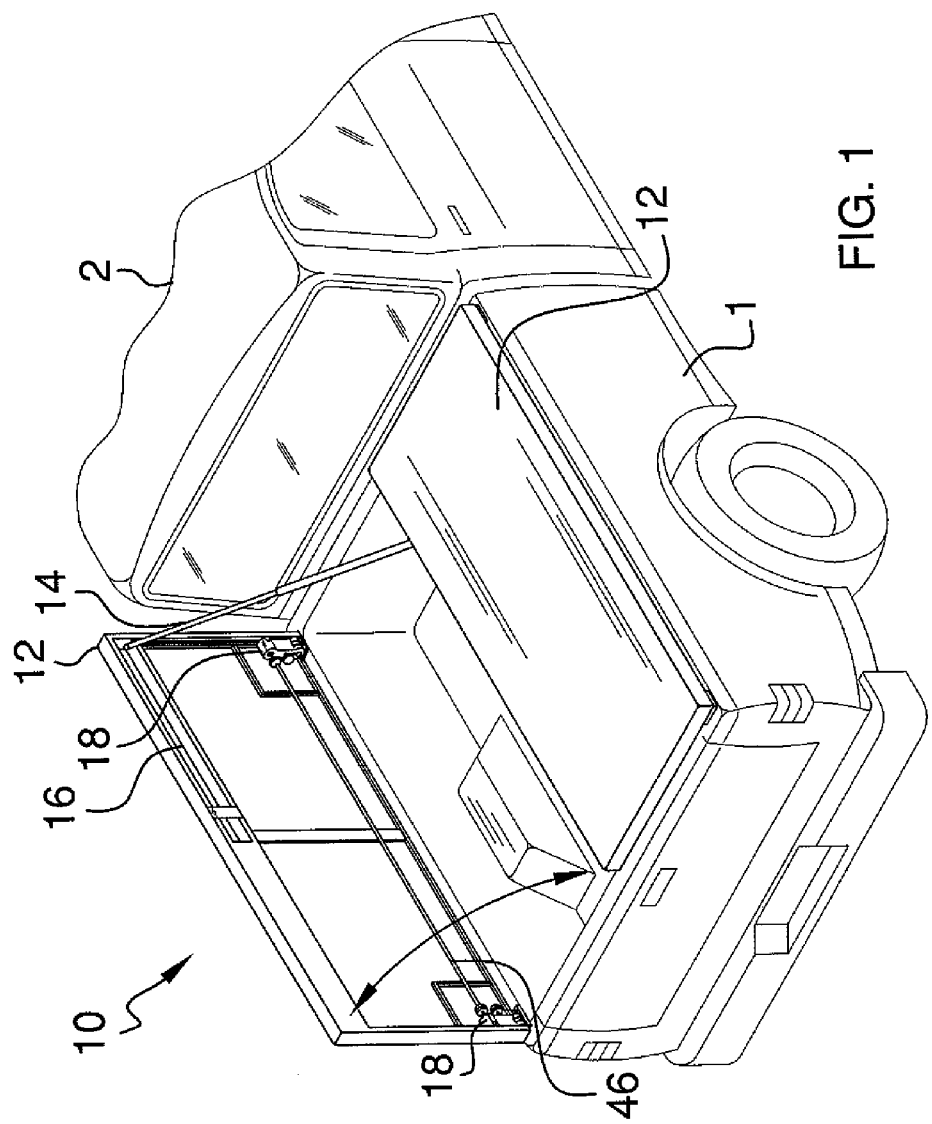
FIG. 1 is a perspective view of a vehicle bed covering system according to the present invention shown in place on a cargo bed of a vehicle.
Figure 2:
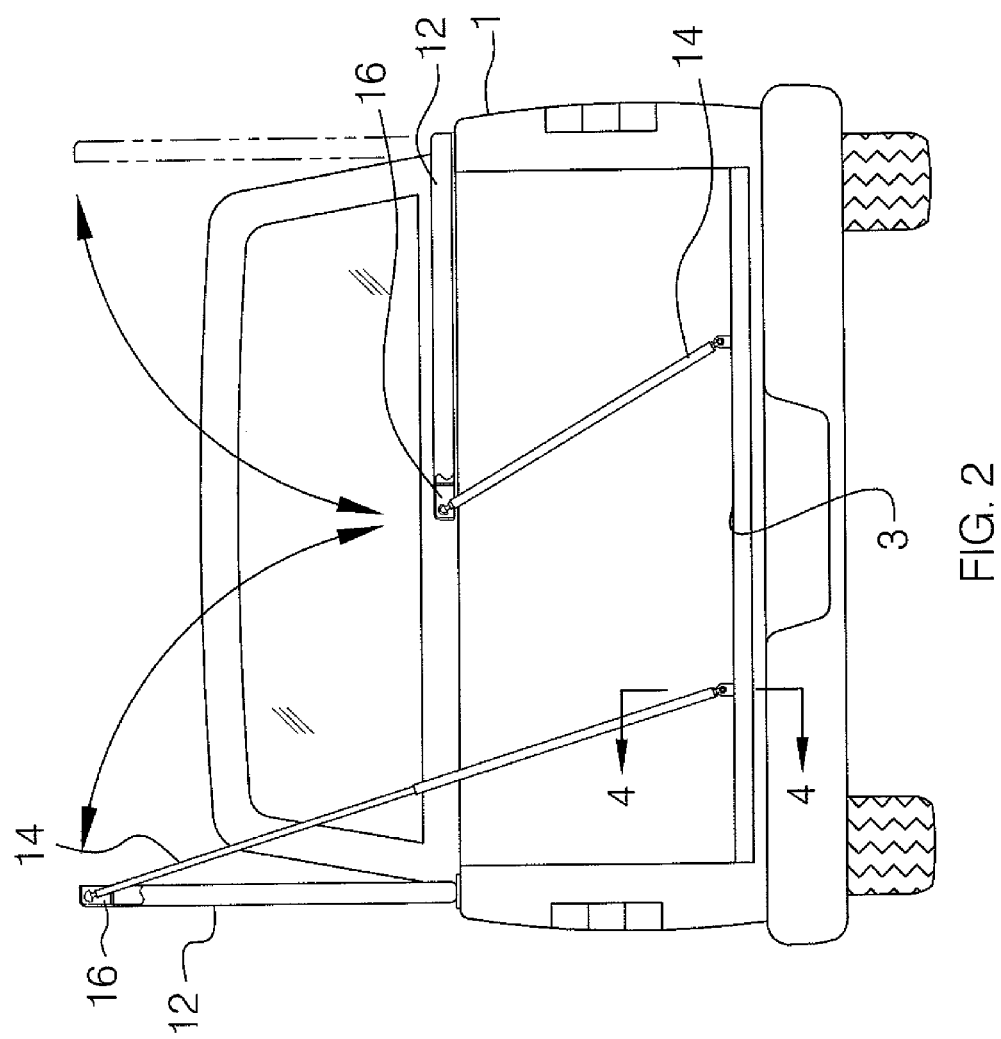
FIG. 2 is a rear view of the present invention showing one of the panels extending upwardly from cargo bed.
Figure 3:
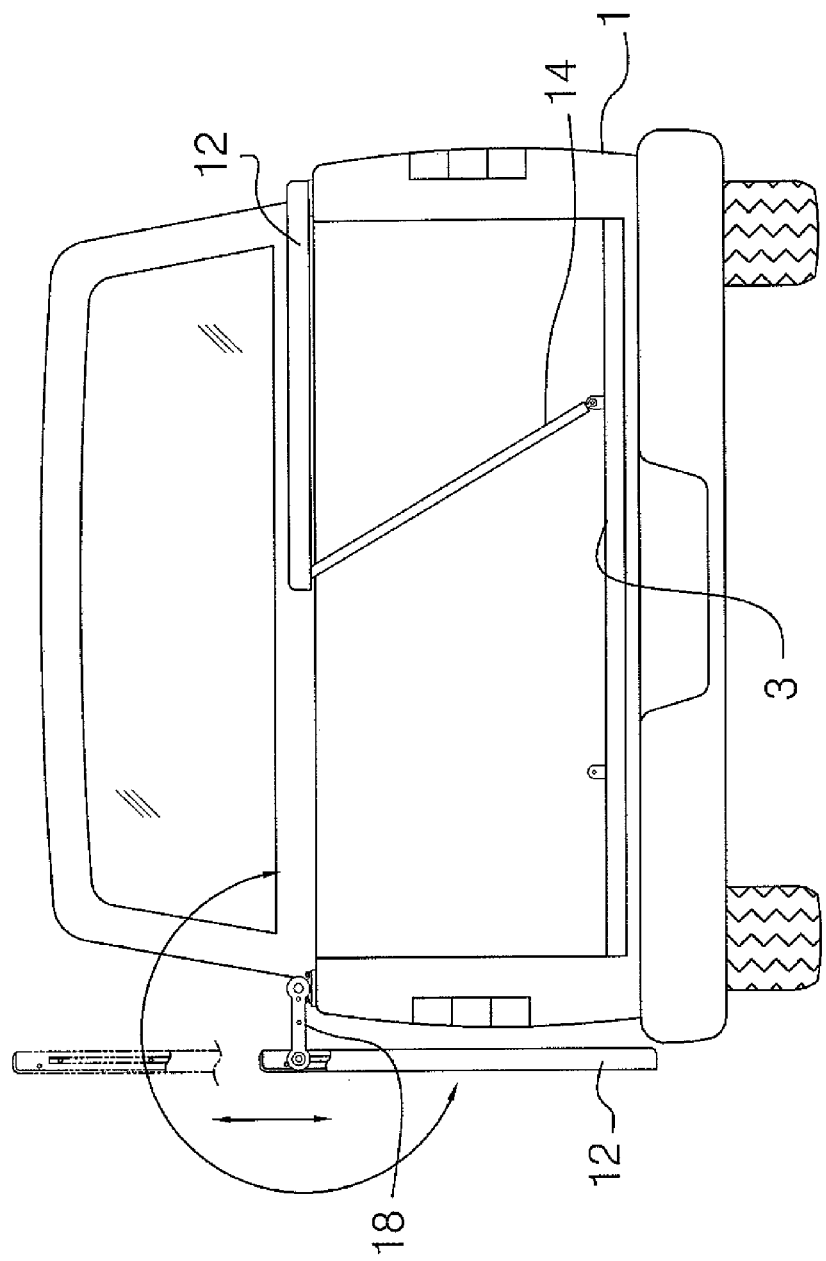
FIG. 3 is a rear view of the present invention showing one of the panels vertically aligned along a side of the cargo bed.
Figure 4:
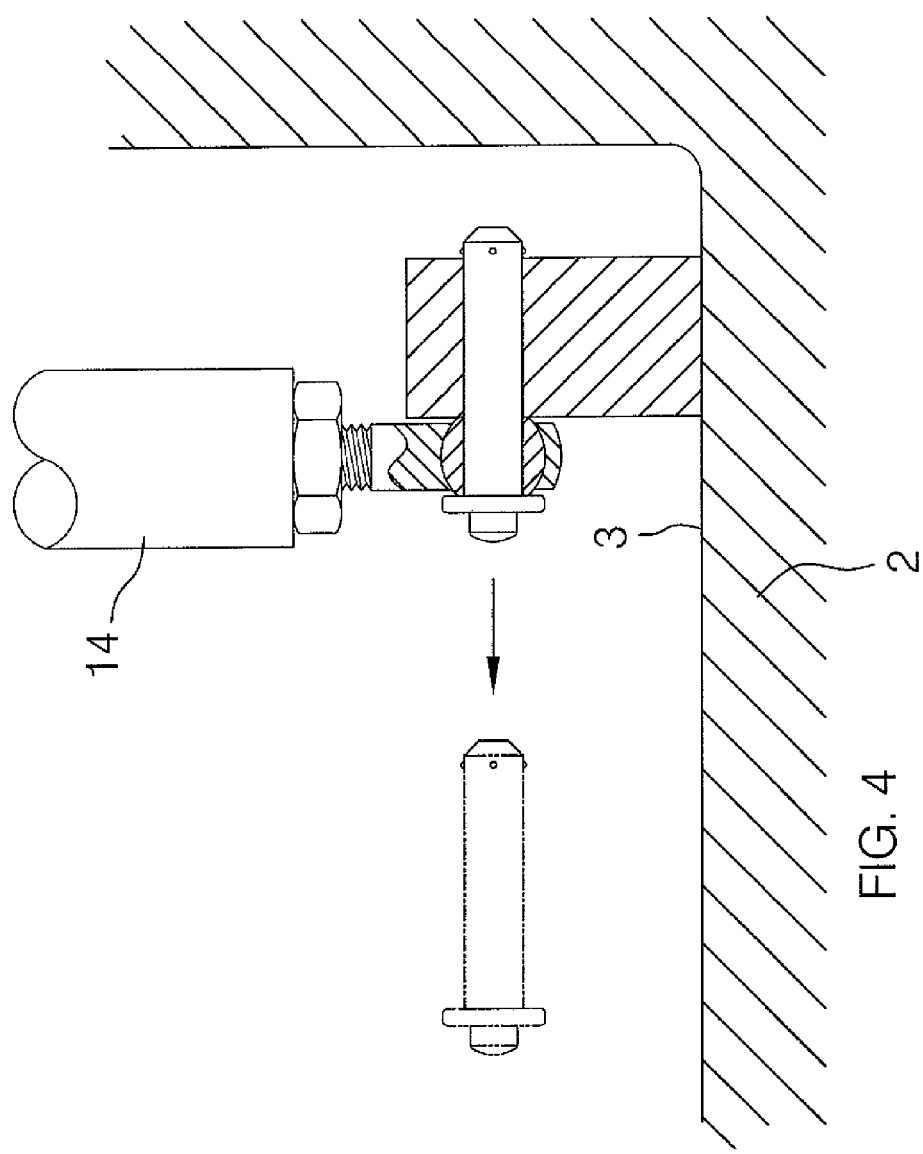
FIG. 4 is a cross-sectional view of the present invention taken along line 4-4 of FIG. 2.
Figure 7:
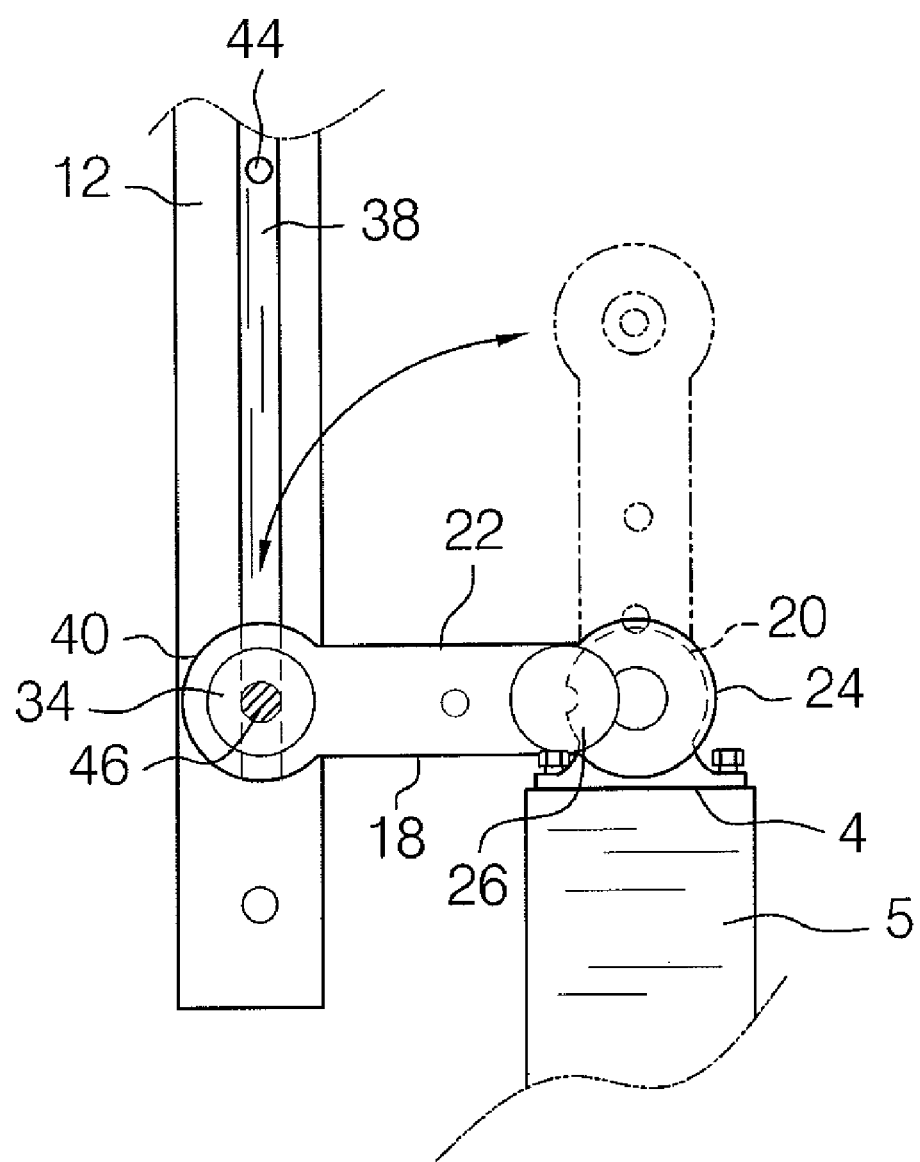
FIG. 7 is a rear view of one of the hinge assemblies of the present invention.
Figure 8:
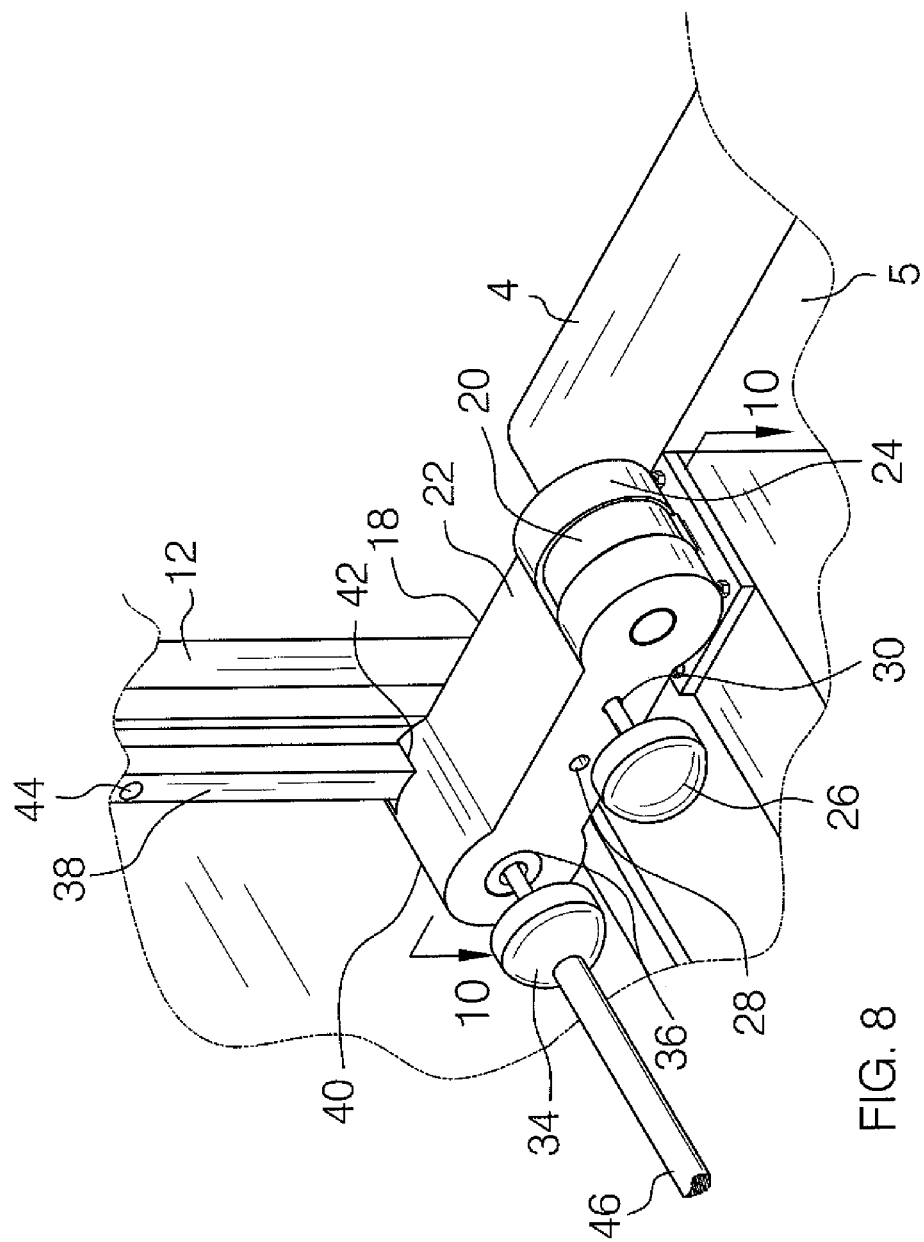
FIG. 8 is a perspective view of one of the hinge assemblies of the present invention.
Figure 9:
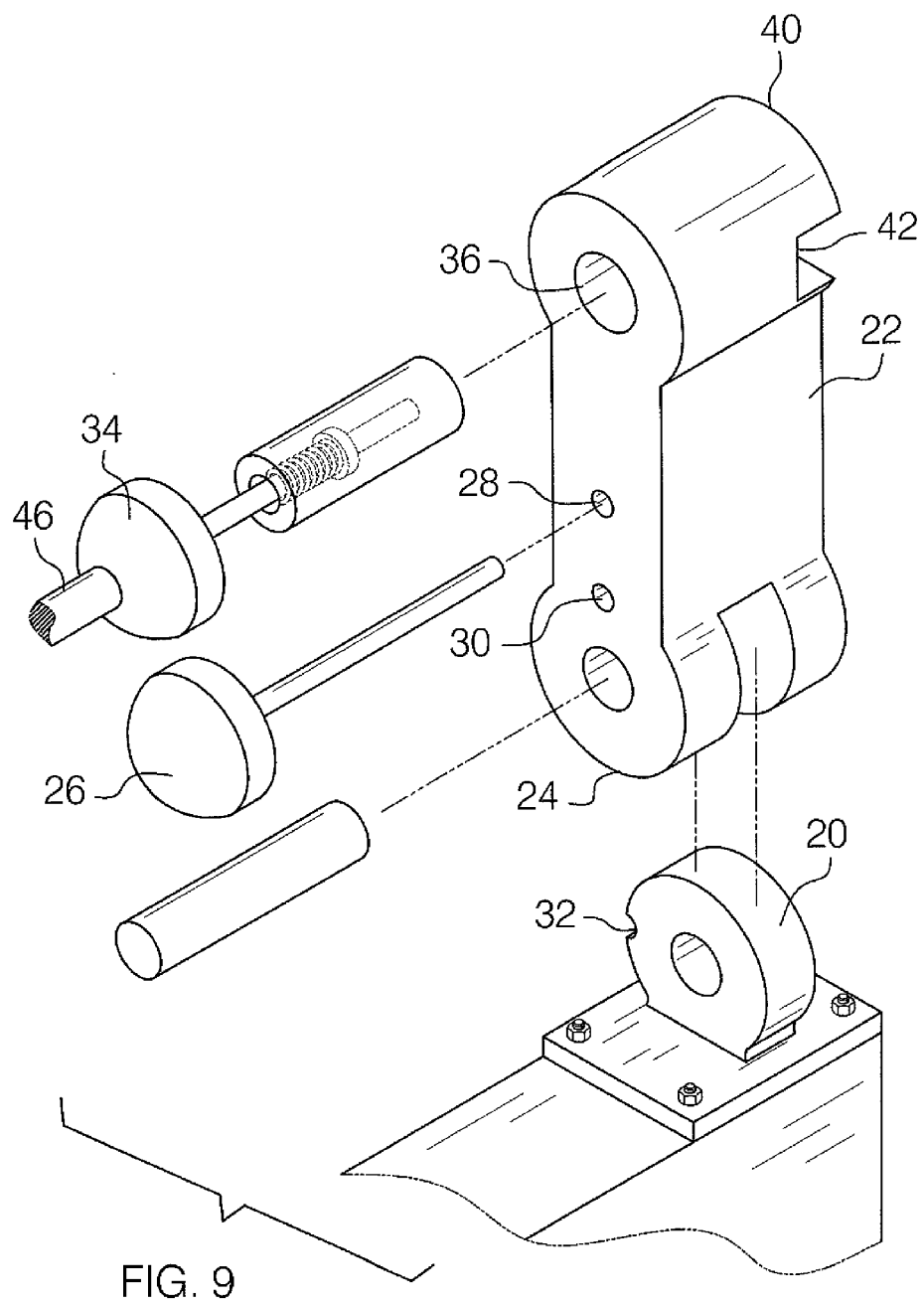
FIG. 9 is an exploded perspective view of one of the hinge assemblies of the present invention.
Figure 10:
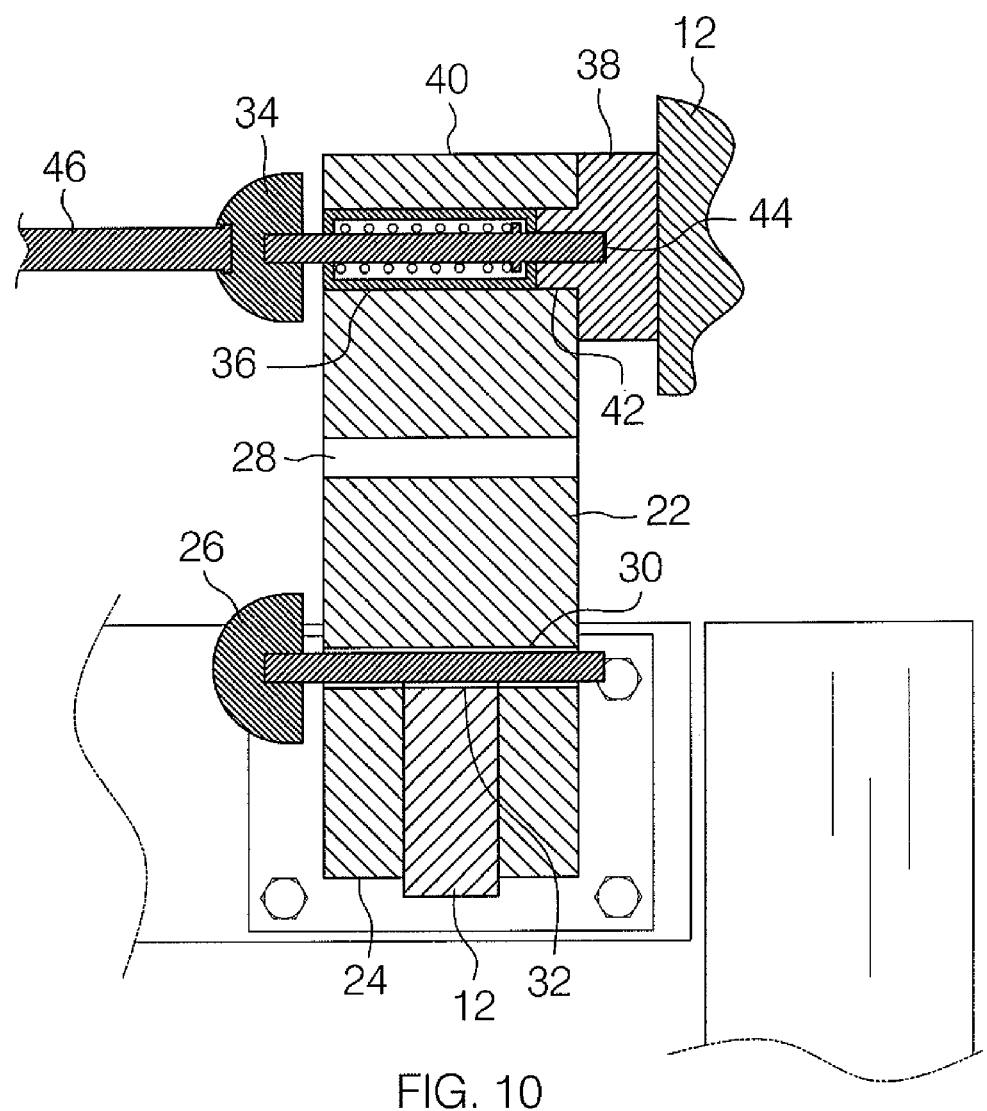
FIG. 10 is a cross-sectional view of the present invention taken along line 10-10 of FIG. 8.

With reference now to the drawings, and in particular to FIGS. 1 through 11 thereof, a new truck bed cover embodying the principles and concepts of the present invention and generally designated by the reference numeral 10 will be described.

As best illustrated in FIGS. 1 through 11, the vehicle bed covering system 10 generally comprises a pair of panels 12 being pivotally coupled to a cargo bed 1 of a vehicle 2. Each of the panels 12 is pivotal over the cargo bed 1 to cover the cargo bed 1. Each of the panels 12 has one of a pair of rams 14 mounted thereto. Each of the rams 14 is mountable to a bed surface 3 of the cargo bed 1. The rams 14 push against the panels 12 to maintain the panels 12 in an open position when the rams 14 are mounted to the bed surface 3. Each of the rams 14 is dismounted from the bed surface 3 and pivoted into a storage channel 16 of the associated one of the panels 12 to inhibit damage to the rams 14 when not in use.

A plurality of hinge assemblies 18 is coupled to a top face 4 of a perimeter wall 5 of the cargo bed 1. Each of the panels 12 has a pair of the hinge assemblies 18 coupled thereto to permit the panels 12 to pivot with respect to the cargo bed 1. Each of the hinge assemblies 18 includes a mounting disk 20 coupled to and extending upwardly from the top face 4 of the cargo bed 1. A hinge arm 22 is hingedly coupled to the mounting disk 20. The hinge arm 22 is pivotal between a first position horizontally positioned over the cargo bed 1 and a second position horizontally extending away from the cargo bed 1. A first end 24 of the hinge arm 22 is hingedly coupled to the mounting disk 20.

Each of the hinge assemblies 18 also includes a securing pin 26 slidably insertable into a first aperture 28 of the hinge arm 22. The securing pin 26 is extendable through the first aperture 28 and into the associated one of the panels 12 to secure the associated one of the panels 12 in an aligned position with the hinge arm 22. The securing pin 26 is slidably insertable into a second aperture 30 of the hinge arm 22. The second aperture 30 is aligned with a notch 32 in the mounting disk 20 when the hinge arm 22 is in second position. The securing pin 26 is extendable through the second aperture 30 and the notch 32 to secure the hinge arm 22 in the second position.

Each of the hinge assemblies 18 additionally includes a locking pin 34 inserted into a locking aperture 36 of the hinge arm 22 opposite the mounting disk 20. The locking pin 34 extends through the locking aperture 36 and into the associated one of the panels 12 when the associated one the panels 12 is aligned with the hinge arm 22. The locking pin 34 is biased to extend into the associated one of the panels 12 when the locking pin 34 is not being actuated.

Additionally, the hinge assemblies 18 each include a rail 38 coupled to the associated one of the panels 12 and positioned adjacent the hinge arm 22. The rail 38 abuts a second end 40 of the hinge arm 22 and is aligned with the hinge arm 22. The associated one of the panels 12 is pivoted to position the rail 38 perpendicular to the hinge arm 22 when the hinge arm 22 is in the second position. The rail 38 is slidably extendable through a slot 42 in the hinge arm 22 that transverses the locking pin 34 and is perpendicular to a longitudinal axis of the hinge arm 22 when the hinge arm 22 is in the second position. The locking pin 34 extends into one of a plurality of height apertures 44 of the rail 38 to adjust a height of the associated one of the panels 12 extending above the hinge arm 22 when the hinge arm 22 is in the second position.

An associated pair of the hinge assemblies 18 has one of a pair of cables 46 coupled thereto. Each of the cables 46 is pulled to actuate the hinge assemblies 18 to release the associated one of the panels 12 to be pivoted with respect to the hinge assemblies 18. Each of the cables 46 extends between the locking pin 34 of the associated pair of the hinge assemblies 18. The cable is pulled to withdraw the locking pins 34 from the associated one of the panels 12 to permit lowering and raising of the associated one of the panels 12 with respect to the hinge assemblies 18.

In use, one of the panels 12 is lifted from the cargo bed 1 into a vertical position and the associated one of the rams 14 is dismounted from the cargo bed 1 and stored in the storage channel 16. The securing pin 26 is removed from the first aperture 28 and the hinge arms 22 are pivoted to the second position. The securing pin 26 is placed into the second aperture 30 to secure the hinge arm 22 of each of the associated hinge assemblies 18 in the second position. The selected one of the panels 12 is now rotatable around the locking pin 34 and is pivoted to a vertical position to align the rails 38 with the slots 42 in the hinge arms 22. The cable 46 is then pulled to retract the locking pins 34 from the panel 12 and allow the rails 38 to slide into the slots 42. The cable 46 is then released to allow the locking pins 34 to extend into the rails 38 and secure the panel 12 at a desired location along a side of the cargo bed 1.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicle bed covering system for covering a cargo bed of a vehicle, said system comprising:
    a pair of panels being pivotally coupled to the cargo bed of the vehicle, each of said panels being pivotal over the cargo bed to cover the cargo bed;
    a plurality of hinge assemblies being coupled to a top face of a perimeter wall of the cargo bed, each of said panels having a pair of said hinge assemblies coupled thereto to permit said panels to pivot with respect to the cargo bed, each of said hinge assemblies including:
        a mounting disk being coupled to and extending upwardly from the top face of the cargo bed;
        a hinge arm being hingedly coupled to said mounting disk, said hinge arm being pivotal between a first position horizontally positioned over the cargo bed and a second position horizontally extending away from the cargo bed, a first end of said hinge arm being hingedly coupled to said mounting disk;
        a securing pin being slidably insertable into a first aperture of said hinge arm, said securing pin being extendable through said first aperture and into the associated one of said panels to secure the associated one of said panels in an aligned position with said hinge arm; and
    a pair of rams, each of said panels having one of said rams mounted thereto, each of said rams being mountable to a bed surface of the cargo bed, said rams pushing against said panels to maintain said panels in an open position when said rams are mounted to the bed surface.

2. The system according to claim 1, wherein said securing pin is slidably insertable into a second aperture of said hinge arm, said second aperture being aligned with a notch in said mounting disk when said hinge arm is in second position, said securing pin being extendable through said second aperture and said notch to secure said hinge arm in said second position.

3. The system according to claim 1, wherein each of said hinge assemblies includes a locking pin inserted into a locking aperture of said hinge arm opposite said mounting disk, said locking pin extending through said locking aperture and into the associated one of said panels when the associated one said panels is aligned with said hinge arm, said locking pin being biased to extend into the associated one of said panels when said locking pin is not being actuated.

4. The system according to claim 3, wherein each of said hinge assemblies includes a rail being coupled to the associated one of said panels and being positioned adjacent said hinge arm, said rail abutting a second end of said hinge arm and being aligned with said hinge arm, the associated one of said panels being pivoted to position said rail perpendicular to said hinge arm when said hinge arm is in said second position.

5. The system according to claim 4, wherein said rail is slidably extendable through a slot in said hinge arm that transverses said locking pin and is perpendicular to a longitudinal axis of said hinge arm when said hinge arm is in said second position, said locking pin extending into one of a plurality of height apertures of said rail to adjust a height of the associated one of said panels extending above said hinge arm when said hinge arm is in said second position.

6. The system according to claim 3, further comprising a pair of cables, an associated pair of said hinge assemblies having one of said cables coupled therein, each of said cables being pulled to actuate said hinge assemblies to release the associated one of said panels to be raised and lowered with respect to said hinge assemblies.

7. The system according to claim 6, wherein each of said cables extends between said locking pin of the associated pair of said hinge assemblies, said cable being pulled to withdraw said locking pins from the associated one of said panels to permit pivoting of the associated one of said panel with respect to said hinge assemblies.

8. The system according to claim 1, wherein each of said rams is dismounted from the bed surface and pivoted into a storage channel of the associated one of said panels to inhibit damage to said rams when not in use.

9. A vehicle bed covering system for covering a cargo bed of a vehicle, said system comprising:
- a pair of panels being pivotally coupled to the cargo bed of the vehicle, each of said panels being pivotal over the cargo bed to cover the cargo bed;
- a plurality of hinge assemblies being coupled to a top face of a perimeter wall of the cargo bed, each of said panels having a pair of said hinge assemblies coupled thereto to permit said panels to pivot with respect to the cargo bed, each of said hinge assemblies comprising:
  - a mounting disk being coupled to and extending upwardly from the top face of the cargo bed;
  - a hinge arm being hingedly coupled to said mounting disk, said hinge arm being pivotal between a first position horizontally positioned over the cargo bed and a second position horizontally extending away from the cargo bed, a first end of said hinge arm being hingedly coupled to said mounting disk;
  - a securing pin being slidably insertable into a first aperture of said hinge arm, said securing pin being extendable through said first aperture and into the associated one of said panels to secure the associated one of said panels in an aligned position with said hinge arm, said securing pin being slidably insertable into a second aperture of said hinge arm, said second aperture being aligned with a notch in said mounting disk when said hinge arm is in second position, said securing pin being extendable through said second aperture and said notch to secure said hinge arm in said second position;
  - a locking pin being inserted into a locking aperture of said hinge arm opposite said mounting disk, said locking pin extending through said locking aperture and into the associated one of said panels when the associated one said panels is aligned with said hinge arm, said locking pin being biased to extend into the associated one of said panels when said locking pin is not being actuated;
  - a rail being coupled to the associated one of said panels and being positioned adjacent said hinge arm, said rail abutting a second end of said hinge arm and being aligned with said hinge arm, the associated one of said panels being pivoted to position said rail perpendicular to said hinge arm when said hinge arm is in said second position, said rail being slidably extendable through a slot in said hinge arm that transverses said locking pin and is perpendicular to a longitudinal axis of said hinge arm when said hinge arm is in said second position, said locking pin extending into one of a plurality of height apertures of said rail to adjust a height of the associated one of said panels extending above said hinge arm when said hinge arm is in said second position;
- a pair of cables, an associated pair of said hinge assemblies having one of said cables coupled thereto, each of said cables being pulled to actuate said hinge assemblies to release the associated one of said panels to be raised and lowered with respect to said hinge assemblies, each of said cables extending between said locking pin of the associated pair of said hinge assemblies, said cable being pulled to withdraw said locking pins from the associated one of said panels to permit pivoting of the associated one of said panel with respect to said hinge assemblies; and
- a pair of rams, each of said panels having one of said rams mounted thereto, each of said rams being mountable to a bed surface of the cargo bed, said rams pushing against said panels to maintain said panels in an open position when said rams are mounted to the bed surface, each of said rams being dismounted from the bed surface and pivoted into a storage channel of the associated one of said panels to inhibit damage to said rams when not in use.

10. A vehicle bed covering system for covering a cargo bed of a vehicle, said system comprising:
- a pair of panels being pivotally coupled to the cargo bed of the vehicle, each of said panels being pivotal over the cargo bed to cover the cargo bed;
- a plurality of hinge assemblies being coupled to a top face of a perimeter wall of the cargo bed, each of said panels having a pair of said hinge assemblies coupled thereto to permit said panels to pivot with respect to the cargo bed, each of said hinge assemblies including:
  - a mounting disk being coupled to and extending upwardly from the top face of the cargo bed;
  - a hinge arm being hingedly coupled to said mounting disk, said hinge arm being pivotal between a first position horizontally positioned over the cargo bed and a second position horizontally extending away from the cargo bed, a first end of said hinge arm being hingedly coupled to said mounting disk
  - a locking pin being inserted into a locking aperture of said hinge arm opposite said mounting disk, said locking pin extending through said locking aperture and into the associated one of said panels when the associated one said panels is aligned with said hinge arm, said locking pin being biased to extend into the associated one of said panels when said locking pin is not being actuated; and
- a pair of rams, each of said panels having one of said rams mounted thereto, each of said rams being mountable to a bed surface of the cargo bed, said rams pushing against said panels to maintain said panels in an open position when said rams are mounted to the bed surface.

11. The system according to claim 10, wherein each of said hinge assemblies includes a securing pin being slidably insertable into a first aperture of said hinge arm, said securing pin being extendable through said first aperture and into the associated one of said panels to secure the associated one of said panels in an aligned position with said hinge arm, said securing pin being slidably insertable into a second aperture of said hinge arm, said second aperture being aligned with a notch in said mounting disk when said hinge arm is in second position, said securing pin being extendable through said second aperture and said notch to secure said hinge arm in said second position.

12. The system according to claim 10, wherein each of said hinge assemblies includes a rail being coupled to the associated one of said panels and being positioned adjacent said hinge arm, said rail abutting a second end of said hinge arm and being aligned with said hinge arm, the associated one of said panels being pivoted to position said rail perpendicular to said hinge arm when said hinge arm is in said second position.

13. The system according to claim 12, wherein said rail is slidably extendable through a slot in said hinge arm that transverses said locking pin and is perpendicular to a longitudinal axis of said hinge arm when said hinge arm is in said second position, said locking pin extending into one of a plurality of height apertures of said rail to adjust a height of the associated one of said panels extending above said hinge arm when said hinge arm is in said second position.

14. The system according to claim 10, further comprising a pair of cables, an associated pair of said hinge assemblies having one of said cables coupled thereto, each of said cables being pulled to actuate said hinge assemblies to release the associated one of said panels to be raised and lowered with respect to said hinge assemblies.

15. The system according to claim 14, wherein each of said cables extends between said locking pin of the associated pair of said hinge assemblies, said cable being pulled to withdraw said locking pins from the associated one of said panels to permit pivoting of the associated one of said panel with respect to said hinge assemblies.

16. The system according to claim 10, wherein each of said rams is dismounted from the bed surface and pivoted into a storage channel of the associated one of said panels to inhibit damage to said rams when not in use.

\* \* \* \* \*